US012574918B2

(12) United States Patent
Patil et al.

(10) Patent No.: US 12,574,918 B2
(45) Date of Patent: Mar. 10, 2026

(54) FRAME EXCHANGE SEQUENCE AND NETWORK ALLOCATION VECTOR (NAV) PROTECTION

(71) Applicant: QUALCOMM Incorporated, San Diego, CA (US)

(72) Inventors: Abhishek Pramod Patil, San Diego, CA (US); George Cherian, San Diego, CA (US); Gaurang Naik, San Diego, CA (US); Alfred Asterjadhi, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 18/491,621

(22) Filed: Oct. 20, 2023

(65) Prior Publication Data

US 2025/0133554 A1 Apr. 24, 2025

(51) Int. Cl.
*H04W 72/12* (2023.01)
*H04W 84/12* (2009.01)

(52) U.S. Cl.
CPC ............ *H04W 72/12* (2013.01); *H04W 84/12* (2013.01)

(58) Field of Classification Search
CPC .............................. H04W 72/12; H04W 84/12
USPC ........................................................ 370/329
See application file for complete search history.

(56) References Cited

PUBLICATIONS

International Search Report and Written Opinion—PCT/US2024/047520—ISA/EPO—Dec. 11, 2024.

Noh S-C., et al., "Considerations on Return TXOP Between Multiple APs", doc IEEE 802.11-23/1327r0, 11-23-1327-00-0UHR-Considerations-on-Return-TXOP-Between-APS, IEEE-SA Mentor, Piscataway, NJ, USA, vol. 802.11 UHR, Sep. 11, 2023, pp. 1-11, XP068205076, Slide 5.

Sun Y., et al., "Follow-up on Coordinated TDMA (C-TDMA)", doc IEEE 802.11-23/0739r0, 11-23-0739-00-0UHR-Follow-up-on-coordinate D-TDMA-C-TDMA, IEEE-SA Mentor, Piscataway, NJ, USA, May 15, 2023, vol. 802.11 UHR, Jul. 8, 2023, pp. 1-9, XP068204015, Slides 5-6.

Das D., et al., (Qualcomm), "C-TDMA Procedure in UHR", IEEE 802.11-23/0216r0, Jan. 2023, pp. 1-8.

Das D., et al., "TXOP Optimizations to Support XR Use-Cases", Aug. 2023, IEEE 802.11-23/1387r1, pp. 1-8.

Kim G., et al., "Coordinated TDMA (Follow Up)", IEEE 802.11-23/1910r1, Nov. 15, 2023, pp. 1-13.

Kim G., et al., "Coordinated TDMA Procedure", IEEE 802.11-23/1912r1, Nov. 13, 2023, pp. 1-23.

(Continued)

*Primary Examiner* — Angel T Brockman
(74) *Attorney, Agent, or Firm* — Patterson+ Sheridan, L.L.P.

(57) ABSTRACT

Certain aspects provide a method for wireless communications at a first wireless node. The method generally includes: outputting, for transmission to a second wireless node, a first frame indicating one or more candidate nodes with which a TXOP may be shared, the one or more candidate nodes including the second wireless node; performing a frame exchange with one or more third wireless nodes that shares a first BSS with the first wireless node; outputting, for transmission to the second wireless node, a second frame indicating a portion of the TXOP to be shared with the second wireless node, the second frame being outputted for transmission after the frame exchange; and obtaining, from the second wireless node, a third frame indicating that the TXOP is being returned back to the first wireless node.

28 Claims, 11 Drawing Sheets

(56)        References Cited

PUBLICATIONS

Noh S-C., et al., (Newracom), "Considerations on Return TXOP between Multiple APs", IEEE 802.11-23/1327r0, Aug. 2023, pp. 1-11.
Ryu K., et al., "C-TDMA TXOP Protection Follow-up)", IEEE 802.11-23, Dec. 2023, pp. 1-8.
Sun Y., et al., (Qualcomm), "Considerations on Coordinated TDMA (C-TDMA)", IEEE 802.11-23/0041r0, Jan. 2023, pp. 1-14.
Sun Y., et al., (Qualcomm), "C-TDMA Procedure in UHR", IEEE 802.11-23/0739r1, Jul. 2023, pp. 1-9.
Verma L., et al., (Qualcomm), "Coordinated AP Time/Frequency Sharing in a Transmit Opportunity in 11be", IEEE 802.11-19/1582r2, Nov. 2019, pp. 1-15.

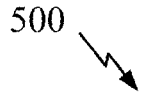
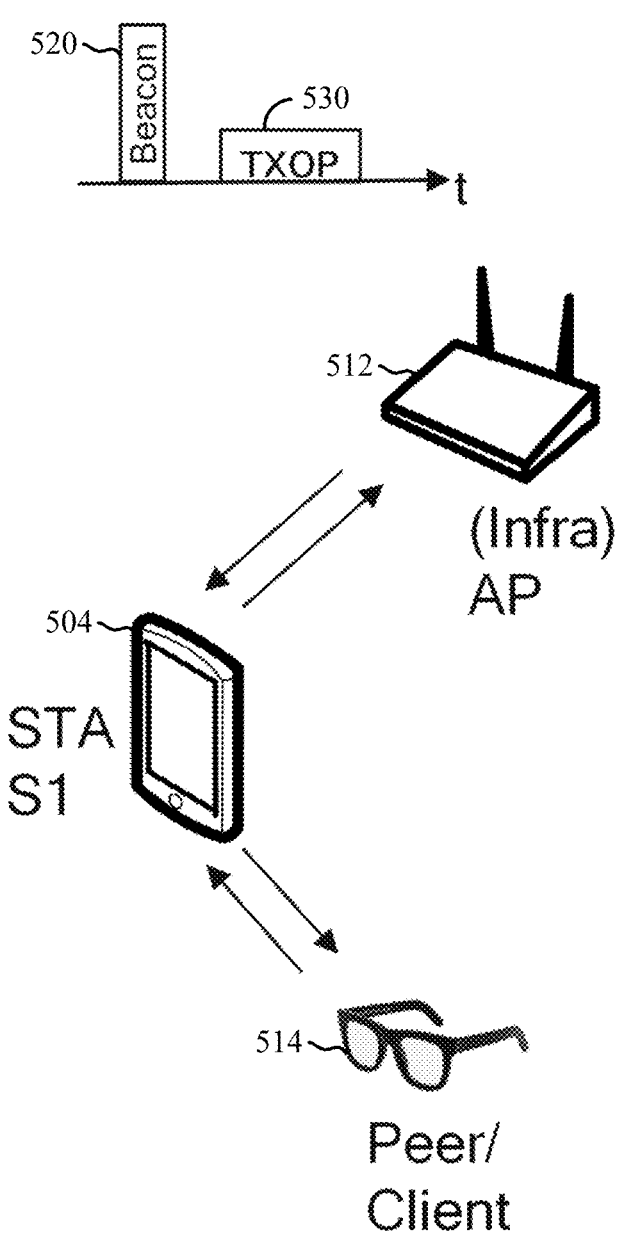
*Figure 5*

900

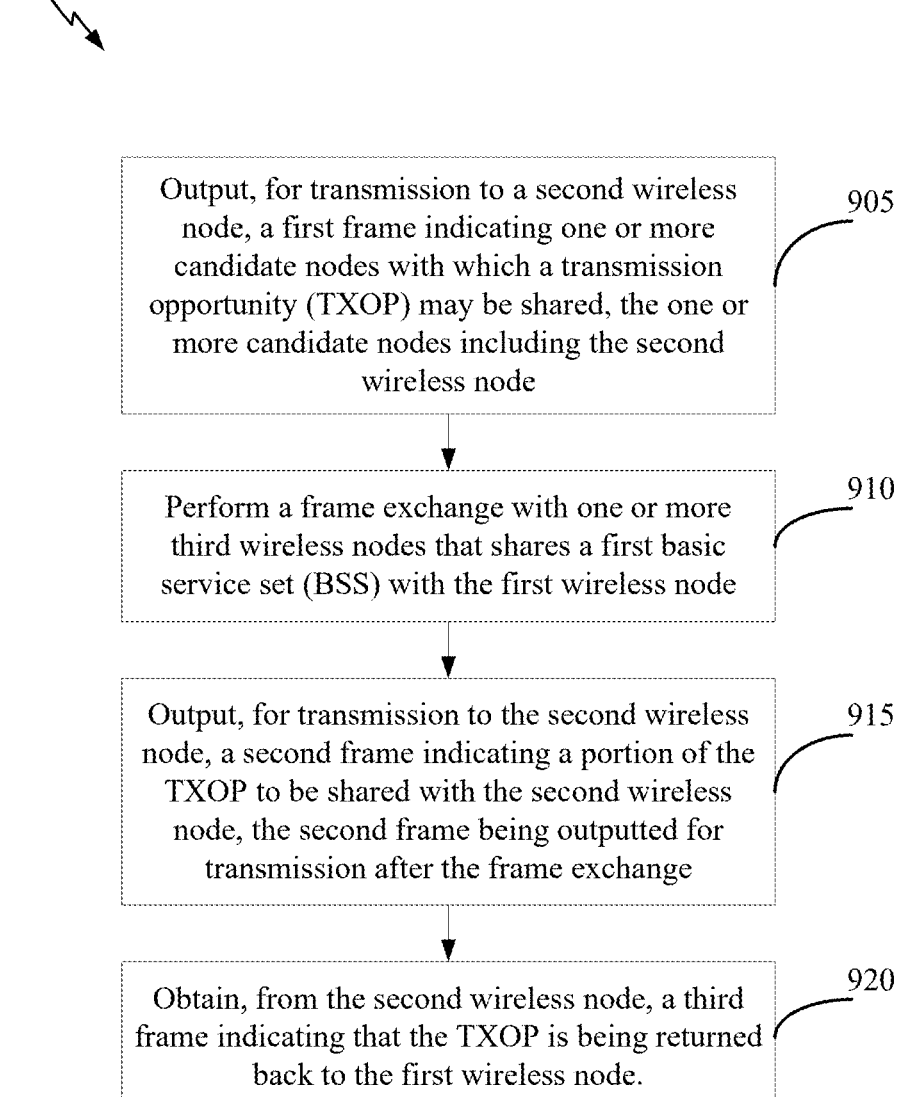

Output, for transmission to a second wireless node, a first frame indicating one or more candidate nodes with which a transmission opportunity (TXOP) may be shared, the one or more candidate nodes including the second wireless node    905

Perform a frame exchange with one or more third wireless nodes that shares a first basic service set (BSS) with the first wireless node    910

Output, for transmission to the second wireless node, a second frame indicating a portion of the TXOP to be shared with the second wireless node, the second frame being outputted for transmission after the frame exchange    915

Obtain, from the second wireless node, a third frame indicating that the TXOP is being returned back to the first wireless node.    920

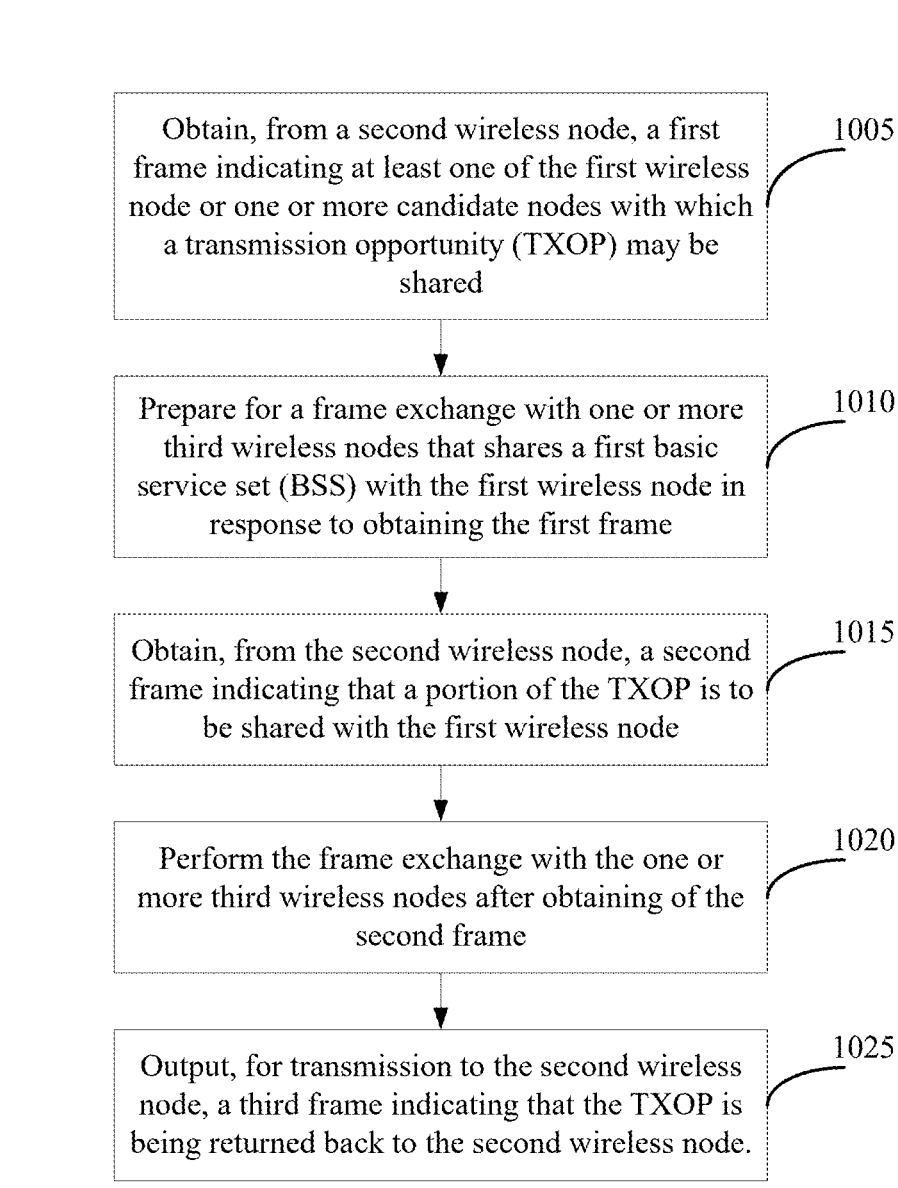

Obtain, from a second wireless node, a first frame indicating at least one of the first wireless node or one or more candidate nodes with which a transmission opportunity (TXOP) may be shared    1005

Prepare for a frame exchange with one or more third wireless nodes that shares a first basic service set (BSS) with the first wireless node in response to obtaining the first frame    1010

Obtain, from the second wireless node, a second frame indicating that a portion of the TXOP is to be shared with the first wireless node    1015

Perform the frame exchange with the one or more third wireless nodes after obtaining of the second frame    1020

Output, for transmission to the second wireless node, a third frame indicating that the TXOP is being returned back to the second wireless node.    1025

*Figure 10*

FRAME EXCHANGE SEQUENCE AND NETWORK ALLOCATION VECTOR (NAV) PROTECTION

TECHNICAL FIELD

This disclosure relates generally to wireless communication, and more specifically, to techniques for scheduling transmit opportunity (TXOP) sharing scenarios.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

Certain aspects provide an apparatus for wireless communications. The apparatus generally includes at least one processor, memory coupled with the at least one processor, and instructions stored in the memory and executable by the at least one processor to cause the apparatus to: output, for transmission to a first wireless node, a first frame indicating one or more candidate nodes with which a transmission opportunity (TXOP) may be shared, the one or more candidate nodes including the first wireless node; performing a frame exchange with one or more second wireless nodes that shares a first basic service set (BSS) with the apparatus; output, for transmission to the first wireless node, a second frame indicating a portion of the TXOP to be shared with the first wireless node, the second frame being outputted for transmission after the frame exchange; and obtain, from the first wireless node, a third frame indicating that the TXOP is being returned back to the apparatus.

Certain aspects provide an apparatus for wireless communications. The apparatus generally includes at least one processor, memory coupled with the at least one processor, and instructions stored in the memory and executable by the at least one processor to cause the apparatus to at least one processor, memory coupled with the at least one processor, and instructions stored in the memory and executable by the at least one processor to cause the apparatus to: obtain, from a first wireless node, a first frame indicating at least one of the apparatus or one or more candidate nodes with which a TXOP may be shared; preparing for a frame exchange with one or more second wireless nodes that shares a first BSS with the apparatus in response to obtaining the first frame; obtain, from the first wireless node, a second frame indicating that a portion of the TXOP is to be shared with the apparatus; performing the frame exchange with the one or more second wireless nodes after obtaining of the second frame; and output, for transmission to the first wireless node, a third frame indicating that the TXOP is being returned back to the first wireless node.

Certain aspects provide a method for wireless communications at a first wireless node. The method generally includes: outputting, for transmission to a second wireless node, a first frame indicating one or more candidate nodes with which a TXOP may be shared, the one or more candidate nodes including the second wireless node; performing a frame exchange with one or more third wireless nodes that shares a first BSS with the first wireless node; outputting, for transmission to the second wireless node, a second frame indicating a portion of the TXOP to be shared with the second wireless node, the second frame being outputted for transmission after the frame exchange; and obtaining, from the second wireless node, a third frame indicating that the TXOP is being returned back to the first wireless node.

Certain aspects provide a method for wireless communications at a first wireless node. The method generally includes: obtaining, from a second wireless node, a first frame indicating at least one of the first wireless node or one or more candidate nodes with which a TXOP may be shared; preparing for a frame exchange with one or more third wireless nodes that shares a first basic service set (BSS) with the first wireless node in response to obtaining the first frame; obtaining, from the second wireless node, a second frame indicating that a portion of the TXOP is to be shared with the first wireless node; performing the frame exchange with the one or more third wireless nodes after obtaining of the second frame; and output, for transmission to the second wireless node, a third frame indicating that the TXOP is being returned back to the second wireless node.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5 shows an example scenario in which TXOP sharing may be utilized.

FIG. 9 shows a flowchart illustrating an example process performable by a wireless node configured as a first AP.

FIG. 10 shows a flowchart illustrating an example process performable by a second wireless node configured as a second AP.

Like reference numbers and designations in the various drawings indicate like elements.

DETAILED DESCRIPTION

Figure 1:
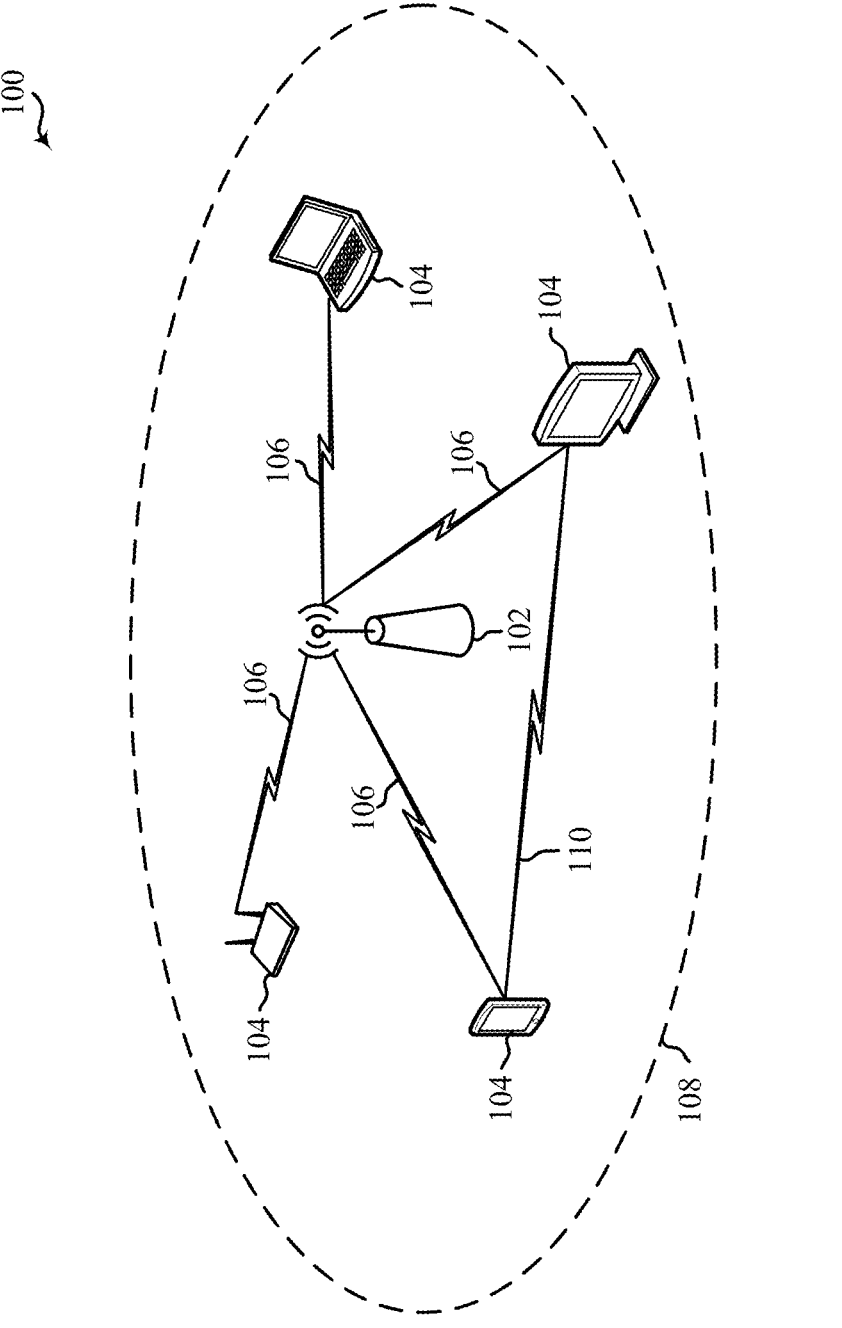
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication. Some aspects more specifically relate to techniques for sharing a transmit opportunity (TXOP).

TXOP sharing generally refers to a mechanism that allows a station (referred to herein as a TXOP sharing station) that has obtained a TXOP (e.g., gains access to a wireless medium for a duration) to share part of the TXOP with another station (referred to herein as a TXOP shared station). For example, an access point (an AP) could share a TXOP with another AP, an AP could share a TXOP with a non-AP station (a STA) or a STA could share a TXOP with another STA. In some cases, a (non-AP) STA may also share a TXOP with the AP. As used herein, the term STA may refer to an AP STA or a non-AP STA. For convenience, however, an AP STA may sometimes be referred to herein as simply an AP, while a non-AP STA may sometimes be referred to as simply a STA. Shared TXOPs may be triggered by transmission of a certain type of frame, for example, that indicates a recipient (the station sharing the TXOP) and a duration. As used herein, a wireless node may refer to an AP or a STA (e.g., a non-AP STA).

In some aspects of the present disclosure, a frame may be transmitted by a TXOP owner AP that allows for other AP to prepare for a possible shared TXOP. For example, the TXOP owner AP (also referred to herein as a "sharing AP") may transmit a first frame indicating one or more candidate APs with which the TXOP may be shared. The sharing AP may then transmit a second frame once the TXOP is to be shared with a shared AP of the one or more candidate APs. The second frame may indicate how long the TXOP may be shared, which may be used based on a buffer status of the shared AP. The first or second frame may also include information indicating how the sharing AP wants the shared AP to use the shared TXOP. For instance, the second frame may indicate that the TXOP is being shared for communication with a specific client (station) or that the TXOP is being shared for a specific category of communication (e.g., video or voice communication). Certain aspects provide a series of frame exchanges that facilitate network allocation vector (NAV) protections for communications using the shared TXOP.

Example Wireless Communication Network

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless access point (AP) 102 and multiple wireless stations (STAs) 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (ps)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Figure 2:
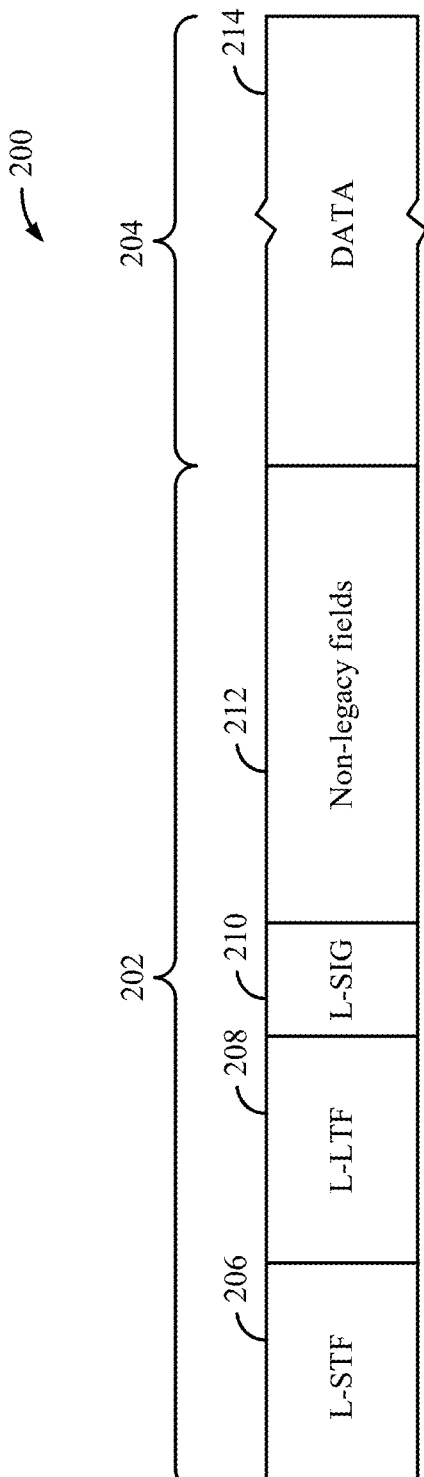
FIG. 2 shows an example protocol data unit (PDU) usable for communications between a wireless access point (AP) and one or more wireless stations (STAs).

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
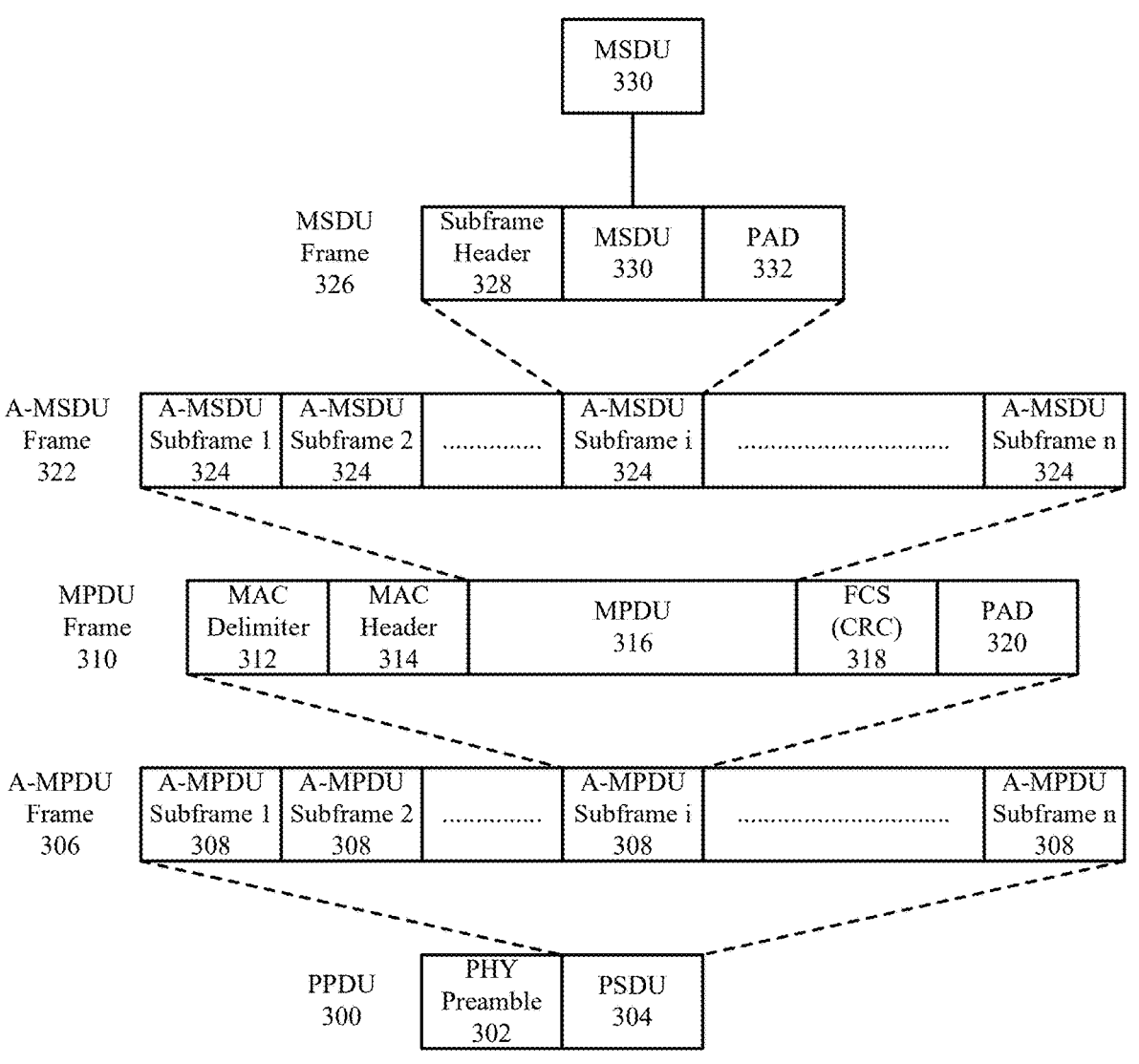
FIG. 3 shows a hierarchical format of an example physical layer PDU (PPDU) usable for communications between a wireless AP and one or more wireless STAs.

FIG. 3 shows a hierarchical format of an example PPDU usable for communications between a wireless AP 102 and one or more wireless STAs 104. As described, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 also may include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Some APs and STAs may implement techniques for spatial reuse that involve participation in a coordinated communication scheme. According to such techniques, an AP may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or EDCA techniques. Additionally, by enabling a group of APs associated with different BSSs to participate in a coordinated AP transmission session, during which the group of APs may share at least a portion of a single TXOP obtained by any one of the participating APs, such techniques may increase throughput across the BSSs associated with the participating APs and may also achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, an RX power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may then be allocated resources during the TXOP as described above.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 4:
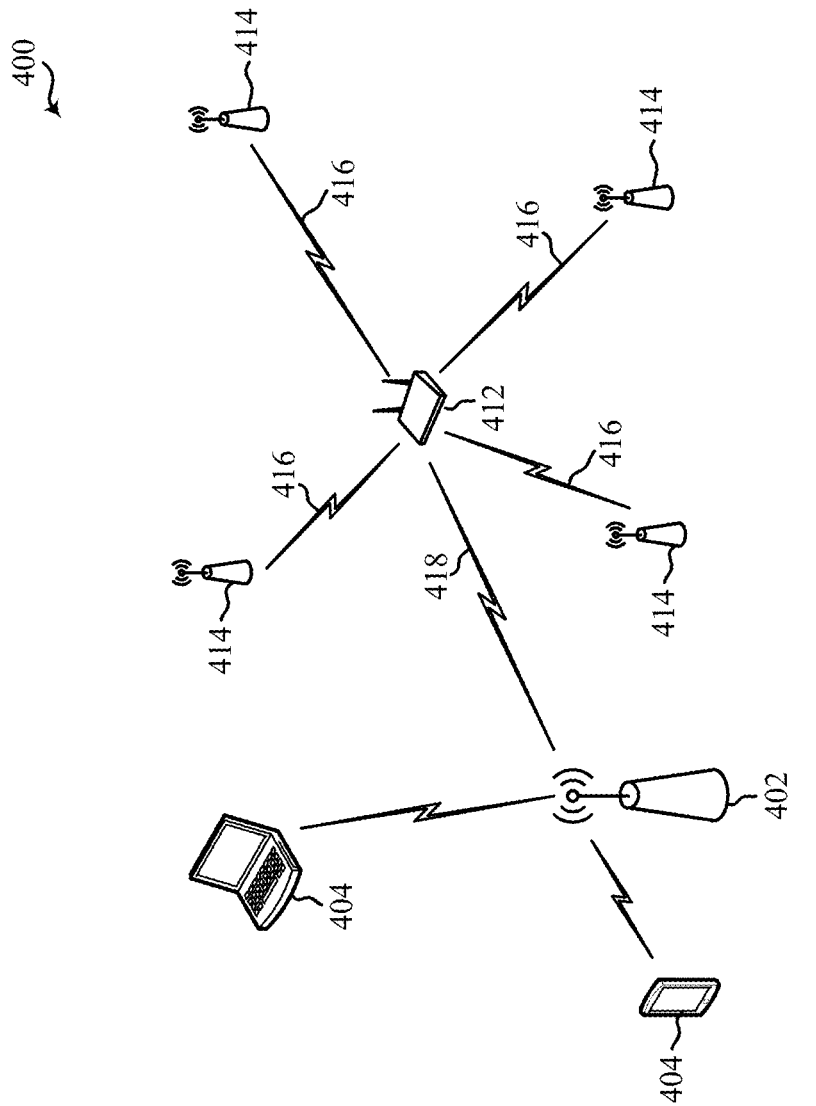
FIG. 4 shows a pictorial diagram of another example wireless communication network.

FIG. 4 shows a pictorial diagram of another example wireless communication network 400. According to some aspects, the wireless communication network 400 can be an example of a mesh network, an IoT network or a sensor network in accordance with one or more of the IEEE 802.11 family of wireless communication protocol standards (including the 802.11ah amendment). The wireless network 400 may include multiple wireless communication devices 414. The wireless communication devices 414 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 414 sense, measure, collect or otherwise obtain and process data and then transmit such raw or processed data to an intermediate device 412 for subsequent processing or distribution. Additionally or alternatively, the intermediate device 412 may transmit control information, digital content (for example, audio or video data), configuration information or other instructions to the wireless communication devices 414. The intermediate device 412 and the wireless communication devices 414 can communicate with one another via wireless communication links 416. In some examples, the wireless communication links 416 include Bluetooth links or other PAN or short-range communication links.

In some examples, the intermediate device 412 also may be configured for wireless communication with other networks such as with a Wi-Fi WLAN or a wireless (for example, cellular) wide area network (WWAN), which may, in turn, provide access to external networks including the Internet. For example, the intermediate device 412 may associate and communicate, over a Wi-Fi link 418, with an AP 402 of a WLAN network, which also may serve various STAs 404. In some examples, the intermediate device 412 is an example of a network gateway, for example, an IoT gateway. In such a manner, the intermediate device 412 may serve as an edge network bridge providing a Wi-Fi core backhaul for the IoT network including the wireless communication devices 414. In some examples, the intermediate device 412 can analyze, preprocess and aggregate data received from the wireless communication devices 414 locally at the edge before transmitting it to other devices or external networks via the Wi-Fi link 418. The intermediate device 412 also can provide additional security for the IoT network and the data it transports.

Example Nav Setting

Traffic originating from real time applications, such as XR or gaming, may have stringent latency requirements. For example, FIG. 5 shows an example scenario 500 in which traffic between a wireless station (STA S1) 504 and a peer device (e.g., an XR headset) 514 may have stringent latency requirements. To accommodate such traffic, an AP 512 (e.g., in infrastructure or "Infra" AP) may broadcast information in beacons (e.g., beacon 520) indicating how transmit opportunities (TXOPs) 530 may be shared.

In certain wireless communications standards (e.g., 802.11be), such traffic may be referred to as latency sensitive traffic. In scenarios involving latency sensitive traffic, a triggered transmission opportunity (TXOP) sharing mechanism may be used to serve low latency traffic (e.g., XR traffic). For example, an AP may allocate a portion of the time within an obtained TXOP to a STA for transmitting one or more non trigger-based (non-TB) PPDUs. Certain aspects of the present disclosure provide techniques for an AP to allocate a portion of TXOP to other APs, as described in more detail herein.

Figure 6:
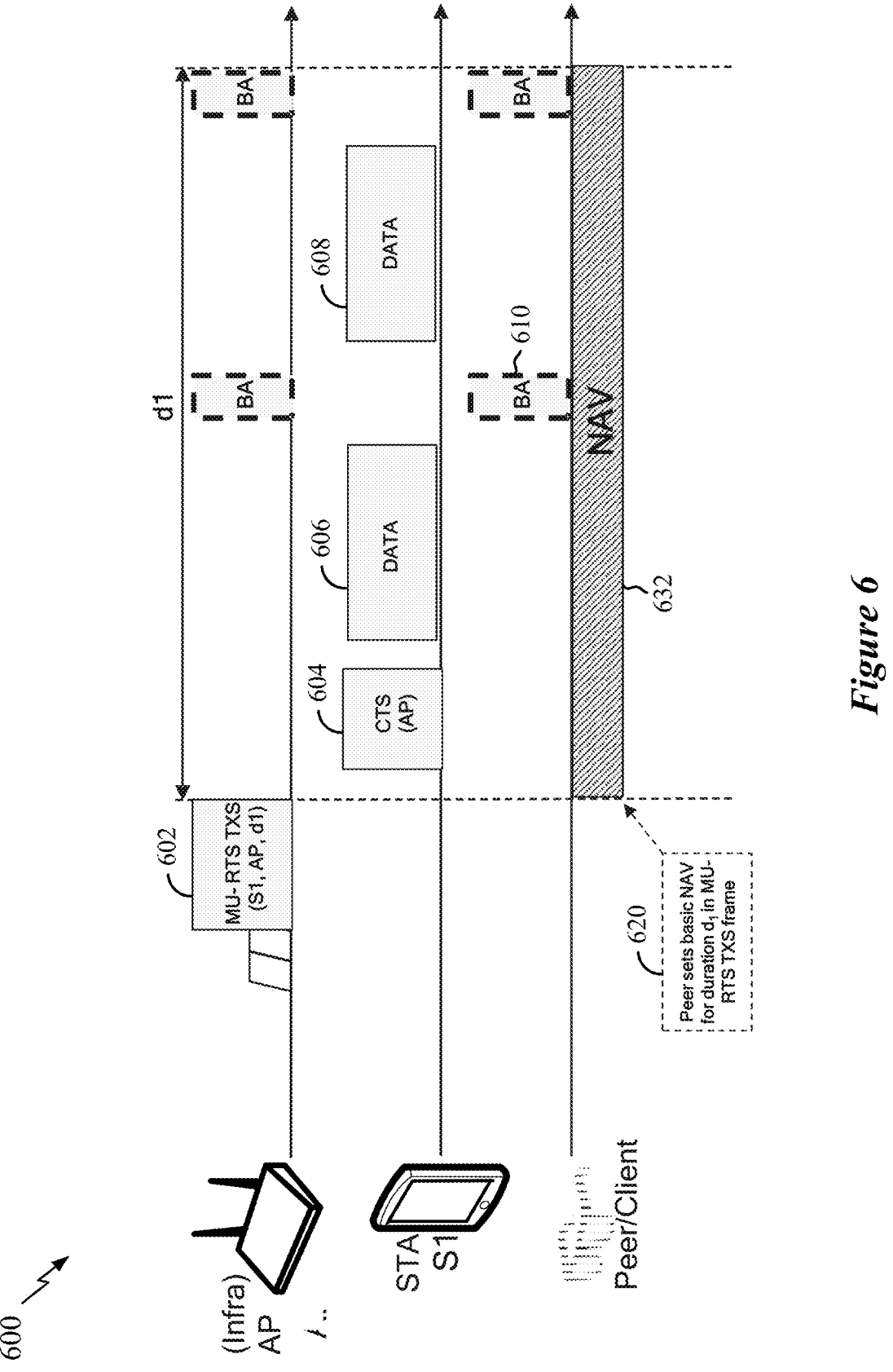
FIG. 6 shows an example scenario in which TXOP sharing may be utilized.

FIG. 6 shows an example of TXOP sharing. As illustrated, after successfully contending for access to the wireless medium and obtaining a TXOP, the AP may transmit a frame 602 to trigger sharing of the TXOP. Frame 602 may be what is referred to as a multi-user (MU) request to send (RTS) for TXOP sharing (TXS). Frame 602 may include a receive address (RA) set to a MAC address of STA S1, a transmit address (TA) set to a MAC address of the AP and a duration field set to a value dl to span to TXOP.

STA S1 may acknowledge the trigger frame 602 with a clear to send (CTS) frame 604, with an RA set to the MAC address of the AP. STA S1 may use the shared TXOP to transmit data to the AP and/or the peer, as shown at 606 and 608. There are various types of TXOP sharing modes for which aspects of the present disclosure may be utilized. In some cases, a particular TXOP sharing mode may be indicated by a subfield value. For example, a first mode (Mode 1) generally refer to a mode in which an MU-RTS initiates an MU-RTS TXOP sharing procedure in which a scheduled STA may only transmit physical layer protocol data unit(s) (PPDU(s)) addressed to its associated AP. A second mode (Mode 2) generally refers to a mode in which an MU-RTS that initiates an MU-RTS TXOP sharing procedure in which a scheduled STA may transmit PPDU(s) addressed to its associated AP or addressed to another STA.

In certain systems, there may be two types of NAVs, an intra-BSS NAV for all frames within a basic service set (BSS), and a basic NAV for overlapping BSS (OBSS) frames (often called inter-BSS frames). A STA may set an intra-BSS NAV timer when it classifies the detected/received frames as Intra-BSS PPDUs (e.g., frames that match the STA's BSS color or frames with a BSSID field that matches the STA's associated AP). A STA sets a basic NAV timer when it detects OBSS frames with a different BSS color, frames with no BSS color in the case of legacy frames, or frames with a BSSID field that doesn't match the STA's associated AP.

As indicated at 620, the peer may set its basic NAV 632 for the duration dl indicated in the trigger frame 602. As illustrated, during the basic NAV, the peer may be limited to sending block acknowledgments (BAs) 610, but is not allowed to transmit. Certain devices (e.g., pre-802.11ax devices) may just use one NAV where as other devices (e.g., 802.11ax and beyond devices) may use Intra-BSS and basic NAV.

Enhanced Techniques for TXOP Sharing

Certain aspects of the present disclosure are directed toward coordinated TDMA (C-TDMA) frame exchange. Once an AP obtains access to the medium, the AP may share the TXOP with one or more other APs referred to herein as "shared APs." The one or more APs may be any suitable APs, such as APs selected as candidate APs for TXOP sharing based on previous negotiations. Certain aspects of the present disclosure are directed towards frame exchanges to implement TXOP sharing, where the frame exchanges influence actions of the shared APs and/or other STAs to facilitate the sharing of the TXOP. In some aspects, a multi-user (MU) request to send (RTS) for TXOP sharing (TXS) frame may be used for schedule announcement and TXOP sharing, although any suitable frame may be used. An initial schedule allocation frame may be used to identify the AP(s) with which the TXOP may be shared, as described in more detail herein.

Figure 7:
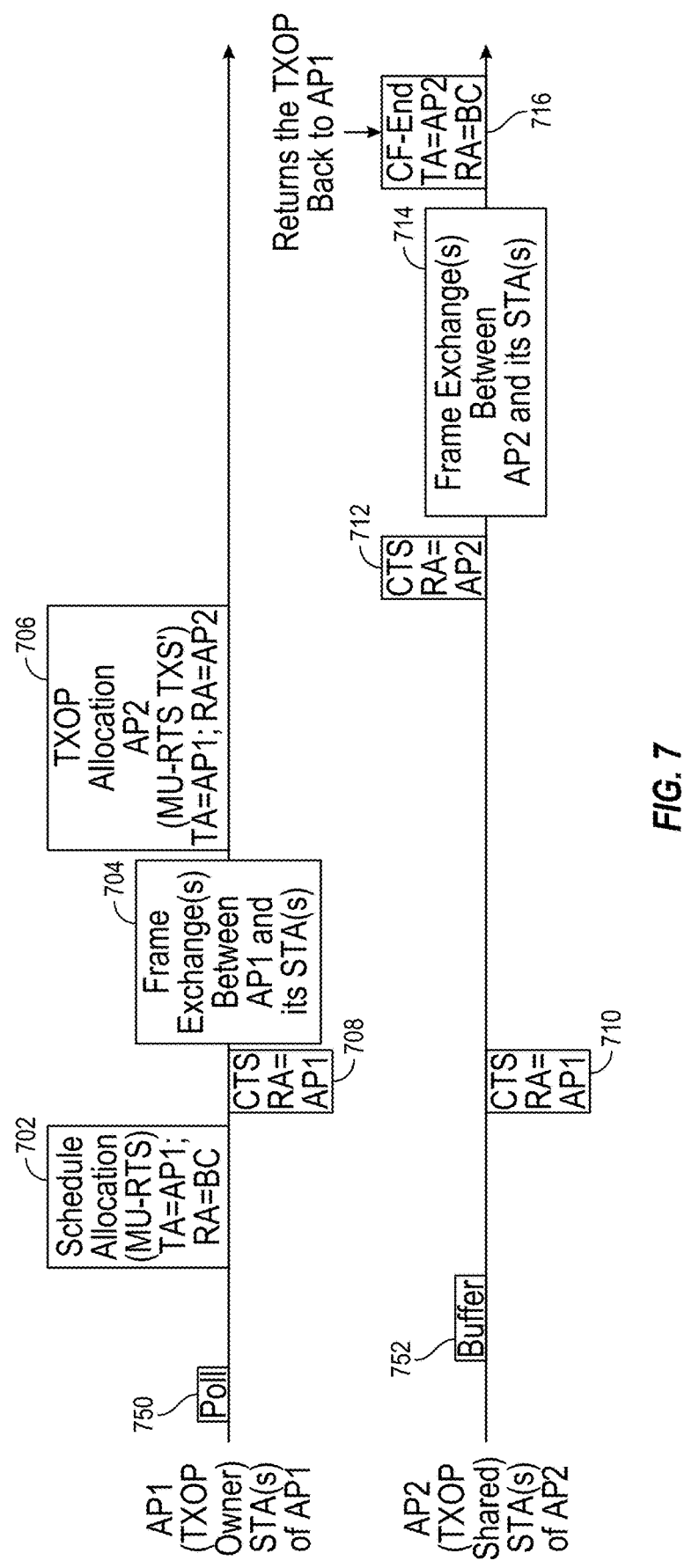
FIG. 7 illustrates an example frame exchange sequence for implementing TXOP sharing, in accordance with certain aspects of the present disclosure

FIG. 7 illustrates a frame exchange sequence for implementing TXOP sharing, in accordance with certain aspects of the present disclosure. The frame exchange sequence helps manage the medium access between shared AP(s) so that the APs (e.g., and associated STAs) do not interfere. In certain aspects, AP1 may transmit a schedule allocation frame 702 which may be used to provide an upfront (e.g., early in the frame exchange sequence) announcement of the AP sharing to facilitate shared AP(s) to prepare for TXOP sharing. The frame 702 may be a multi-user (MU) request to send (RTS) for TXOP sharing (TXS) frame (e.g., or MU-RTS TXS frame), in some aspects, although any suitable frame may be used. The frame 702 may include a transmit address (TA) field that may be set to an identifier associated with AP1 and a receive address (RA) field that may be set to broadcast (BC), as shown. The frame 702 may be implemented as an MU-RTS frame that may not include a BSSID field, in some implementations. The frame 702 may announce that AP1 may share a portion of the TXOP with AP2 (and in some cases, one or more other APs, such as AP3 not shown in FIG. 7).

The frame 702 prepares in-BSS STA(s) serviced by AP1. For example, as shown, the STA(s) of AP1 may transmit a clear-to-send (CTS) frame 708 with an RA field set to an identifier of AP1 ahead of the frame exchange 704 between AP1 and STA(s) of AP1. The CTS frame may not include a TA field, in some implementations. Similarly, AP2 may send a CTS frame 710 with an RA field set to an identifier of AP1 to set appropriate network allocation vector (NAV) timers in anticipation of the frame exchange 704 by AP1 with AP1's STA(s), as described in more detail herein. The CTS frames 708, 710 may be identical frames in some aspects, allowing the CTS frames to be superimposed on each other.

After the frame exchange 704, AP1 may send a TXOP allocation frame 706. The frame 706 may be a MU-RTS TXS frame (or a modified version of a MU-RTS TXS frame, labeled MU-RTS TXS'), although any suitable frame may be used. The TA field of the frame 706 may be set to an identifier of AP1 and the RA field of frame 706 may be set to an identifier of AP2, indicating that the TXOP is being shared by AP1 with AP2. AP2 may then transmit a CTS frame 712 (e.g., with an RA field set to an identifier of AP2, also referred to herein as a "CTS2self" frame). Upon receiving AP1 TXOP allocation frame (with RA=AP2), another AP (AP3) identified in AP1's schedule announcement frame may transmit a CTS frame with RA set to AP2. When the sharing AP (e.g., AP1) shares TXOP with another AP (e.g., AP2), other candidate AP(s) (e.g., AP3) may transmit a frame (e.g., a CTS frame) with an RA field set to an identifier of the shared AP. In this manner, further protection may be provided from STA(s) associated with the other candidate AP(s) that are hidden to the shared AP and the sharing AP and that did not receive the TXOP allocation frame 706 from the sharing AP and the CTS response frame 712 from the shared AP. Without such a frame from the candidate AP, it is possible that the hidden STAs of the candidate AP sense the medium as idle and perform channel access which may jeopardize sharing of the TXOP at a later time when the sharing AP tries to share the TXOP with the candidate AP. The TXOP allocation frame 706 from the sharing AP (e.g., AP1) may include some indication that allows the candidate AP(s) (e.g., AP3) to identify the frame 706 as a TXOP allocation frame. Thus, the candidate AP (e.g., AP3) may process the frame to identify the sharing AP (e.g., AP1) and responds to the frame 706 with a CTS frame with the RA field set to an identifier of the shared AP (e.g., AP2). In some aspects, the candidate APs will identify the frame as TXOP allocation frame based on the frame type and the TA being for the sharing AP (AP1) and RA being set to one of the candidate AP (e.g., AP2) identified in the initial schedule allocation frame.

After transmission of frame 712, the frame exchange 714 may occur between AP2 and the AP2's STA(s), as shown. A frame 716 may transmitted by AP2 to return the TXOP back to AP1. The frame 716 may be a control frame (CF) to end the TXOP sharing (e.g., a CF-END frame), although any suitable frame may be used. As shown, a TA field of the frame 716 may set to an identifier of AP2 and an RA field of the frame 716 may be set to broadcast (BC).

In certain aspects of the present disclosure, the announcement by the frame 702 allows the shared AP(s) (e.g., AP2) to prepare for the TXOP sharing by, for example, allowing the shared AP(s) to account for any processing delays. With frame 702 indicating that the TXOP may be shared with AP2, AP2 may forgo any transmissions to avoid interfering with the transmission of AP1 and knowing that the TXOP may be shared with AP2, allowing such data transmissions to occur once the TXOP is shared. Moreover, AP1 may intend to share the TXOP with AP2 and another AP (AP3) sometime after sharing with AP2. Thus, both AP2 and AP3, receiving the frame 702, know not to access the channel within the duration of TXOP until the TXOP is shared with the respective AP. Moreover, once the TXOP is shared with AP2 via transmission of frame 706, AP2 may have to begin frame exchange with AP2's STA(s) within a short period (e.g., a short interframe space (SIFS)). Thus, by AP2 having an early indication that the TXOP may be shared with AP2 via frame 702, AP2 is able to account for any processing delays so that AP2 can properly begin the frame exchange 714 with AP2's STA(s). For instance, AP2 may have multiple queues for frame exchanges, and based on the announcement of TXOP sharing via frame 702, may determine which queue to prioritize in anticipation of the TXOP sharing from AP1. As one example, AP1 may a router AP, AP2 may be a relay AP, and there may be client for which the router AP has traffic for. The router AP may share the TXOP with the relay AP, yet indicate via frame 702 that the relay AP is to use the shared TXOP to communicate frames with the client. Thus, AP2 may reorganize queues to use the shared TXOP to service that particular client. In a similar manner, the TXOP may be shared by AP1 with AP2 for AP2 to service a specific traffic flow (e.g., a particular traffic identifier (TID)). Thus, the upfront announcement via frame 702 allows AP2 to prepare for the frame exchange during the shared TXOP. In some aspects, APs may provide information related to their respective processing delays via advertisement in a broadcast frame such as a beacon frame, a broadcast probe response frame, or a beacon follow-up frame or during negotiation with another AP for coordination. A TXOP owner AP may take into account a neighboring AP's processing delay to decide when to share the TXOP with that neighboring AP.

In some aspects, the frame 702 may indicate other information to facilitate the TXOP sharing. For instance, the frame 702 may indicate an order of APs with which the TXOP may be shared (e.g., that the TXOP may be first shared with AP2, then shared with AP3, and so on). The frame 702 may also indicate timing information, if known, with respect to the TXOP sharing. In some scenarios, AP1 may not know how long the frame exchange 704 may last, and thus, AP1 may not be able to indicate within frame 702 when the TXOP may be shared with AP2. In some scenarios, such timing information may be known by AP1 and may be indicated in frame 702. For example, AP1 may be a router AP and AP2 is a relay AP, and the TXOP may be shared for multi-hop transmission from AP1 to AP2 and eventually to a client. In this case, AP1 may know the frame size and data rate associated with exchange 704, and thus, may know when exchange 704 may end. Thus, AP1 may be able to indicate when TXOP may be shared with AP2 via frame 702, providing AP2 more information to prepare for the associated frame exchange.

In some aspects, the frame 702 may identify the shared AP(s) and in-BSS STA(s) via any suitable identifier, such as by using an association identifier (AID) field (e.g., as part of a user information field of the frame 702). Each shared AP(s) may be identified via the shared AP's BSS color and a portion of the shared AP's BSSID. For example, the shared AP may be identified using six least-significant bits (LSBs) of the BSSID of the AP and (e.g., concatenated with) six bits of the AP's BSS color (e.g., a six bit identifier of the BSS). It is possible that two APs may have the same BSS color, referred to herein as a color collision. The partial BSSID will help to distinguish between APs in case of color collision, as described. Thus, the frame 702 may identify AP2 as the AP with which the TXOP may be shared by including the AID of AP2 and the six LSBs of the BSSID associated with the BSS of AP2. During negotiations (e.g., negotiating TDMA sharing or AP to AP coordination), APs may indicate respective identifiers (e.g., AID values), allowing the sharing AP (e.g., AP1) to identify the shared AP(s) (or vice versa) for TXOP sharing. In some aspects, a back-end controller may allocate AP identifiers to be used for frame exchanges to implement TXOP sharing. Thus, APs may assign an identifier to each other as part of a negotiation frame exchange or announce the identifier for other APs in respective beacon frames. In some cases, in an operator deployed network, a centralized controller may assign unique identifiers for each AP and each AP may be aware (via the backend) of the identifiers for other APs in its neighborhood.

In some aspects, in-BSS STA(s) may be identified based on AID. The in-BSS STA(s) may include legacy, current-generation, or next-generation STAs, such as high-efficiency (HE), extremely high throughput (EHT), or ultra-high reliability (UHR) STAs, in some aspects. In some aspects, the frame 702 may be any suitable frame, such as a TXS variant frame. In some aspects, the frame 702 may include a field indicating the length of the TXOP (e.g., total length of TXOP owned by AP1), helping shared AP(s) identify how long to hold off on channel access (e.g., wait for a shared TXOP from this AP). In some aspects, while frame 702 may indicate AP(s) that AP1 may share the TXOP with, the frame 702 does not guarantee that the TXOP will be shared with those APs.

As described, a TXOP allocations frame 706 (e.g., also referred to herein as a "sharing frame") may be transmitted by AP1 to share the TXOP. As shown, the frame 706 may be an MU-RTS TXS or a variant of the MU-RTS TXS frame. The frame 706 may provide information regarding how long the TXOP is being shared with the AP identified in the frame. For instance, the frame 706 may indicate a duration of how long the TXOP may be shared, which may be based on an estimate favoring over allocation as opposed to under allocation of the shared duration. Once the frame exchange 714 is complete, a frame 716 may be transmitted by AP2 to return the TXOP back to AP1, as described in more detail herein.

In some implementations, neighboring APs may indicate to AP1 their buffer status. AP1 may thus know how full AP2's frame buffer is, allowing AP1 to more accurately estimate how long to share the TXOP. The buffer status that is shared may be a per-client buffer (e.g., indicating frames buffered for transmission for a particular client), the buffer may be per-TID (e.g., indicating frames buffered for transmission for a particular TID), the buffer may be for a particular flow (e.g., indicating frames buffered for transmission for a certain traffic flow), or an aggregate of total buffer status. In some aspects, the buffer status may be indicated in a respective beacon frame. For instance, a beacon (e.g., such as a beacon 520 shown in FIG. 5) transmitted by AP2 may include a field indicating AP2's buffer status. In some aspects, the TXOP-owner AP (e.g., AP1) may poll (e.g., send a polling message 750 shown in FIG. 7) other APs (e.g., AP2) to receive their respective buffer status (e.g., send buffer status 752 in response to polling message 750), based on which the duration of the TXOP sharing may be determined. In some aspects, the frame 702 or frame 706 may indicate a traffic priority for TXOP sharing, which may also be based on the buffer status (e.g., of AP2).

In some aspects, the frame 706 may indicate a certain communication category (e.g., video category, or voice category) for which the TXOP is being shared. In some cases, the frame 702 or frame 706 may indicate that the TXOP is being shared for communication with specific STA(s) of AP2. For example, if AP2 is a relay AP and one of the STAs of AP2 is a client with which AP1 is to send frames, AP1 may indicate that the TXOP is being shared with AP2 for the specific purpose of sending frames to the client.

As described, a frame 716 may be used to return the TXOP back to AP1. The frame 716 may be any suitable frame, such a CF-END frame that is also used to reset a NAV timer for certain category of STAs, as described in more detail herein.

Certain aspects of the present disclosure are directed toward techniques for NAV protection with respect to TXOP sharing. The NAV protection techniques may allow for both downlink and trigger-based uplink transmissions (e.g., from sharing and shared APs). The techniques may allow legacy (e.g., HE/EHT) STAs to participate in the C-TDMA sequence even during a shared TXOP. The techniques may allow an unused portion of a shared TXOP to be returned to the sharing AP and for the sharing AP to use the unused portion of the TXOP for the sharing AP's own BSS or further share the portion of the TXOP with another AP, as described in more detail herein. The techniques described herein avoid or minimize changes or exceptions to baseline rules due to interoperability risks.

Figure 8:
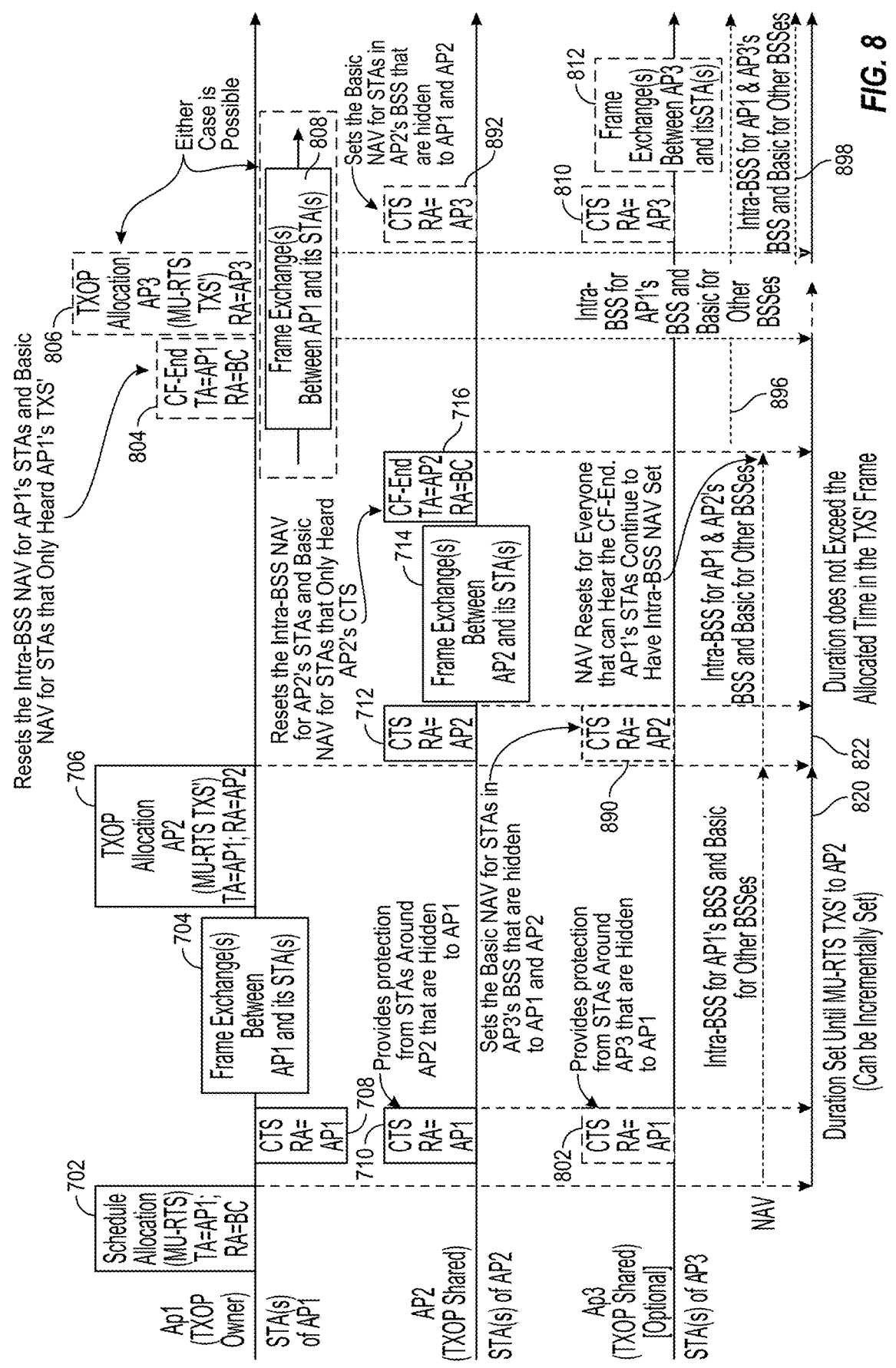
FIG. 8 illustrates an example frame exchange sequence for implementing TXOP sharing and network allocation vector (NAV) protection, in accordance with certain aspects of the present disclosure.

FIG. 8 illustrates a frame exchange sequence for implementing TXOP sharing and NAV protection, in accordance with certain aspects of the present disclosure. As shown, in response to the frame 702, the STA(s) of AP1 may transmit CTS frame 708, AP2 may transmit CTS frame 710, and AP3 may transmit CTS frame 802. Each of the CTS frames 708, 710, 802 may have an RA field set to an identifier of AP1. As shown, the transmission of frame 702 begins a duration 820 during which the TXOP is used for AP1 frame exchanges (e.g., frame exchange 704) with associated STA(s). The duration 820 ends once the frame 706 (e.g., sharing the TXOP with AP2) is transmitted. During duration 820, intra-BSS NAV may be set for AP1's BSS (e.g., since the frame 702 and CTS frames 710, 802 have an RA set to the identifier of AP1), and basic-NAV may be set for other BSSs (e.g., BSS of AP2 and BSS of AP3 that receive frame 702). In some aspects, in response to receiving frame 706, AP3 may (optionally) transmit a frame 890 (e.g., a CTS frame) with a RA field set to an identifier of AP2, cause a basic-NAV to be set by STA(s) of AP3's BSS that may be hidden to AP1 and AP2. The transmission of the CTS frames by AP2 and AP3 extends the NAV protection for the frame exchange of AP1 as the CTS frames may be received by nodes that may be hidden from AP1 (e.g., that may be outside a communication range of AP1).

In some cases, the duration 820 may be set incrementally. For instance, the NAV set during duration 820 can be incrementally set (e.g., prolonged) if the owner AP (e.g., AP1) is unsure of the duration AP1 needs to serve STA(s) of AP1. For example, the TXOP may be used to communicate with a first STA (e.g., while other STAs are in sleep mode), then prolonged to communicate with a second STA, and so on. Thus, the NAV timer may set for communication with the first STA, then prolonged with communication with the second STA, and so on.

The TXOP owner AP (e.g., AP1) sets the NAV until the frame 706 (e.g., MU-RTS TXS') is transmitted that passes the TXOP to a shared AP, accounting for potential retries that increase the time AP1 needs to perform the frame exchange 704 with associated STA(s). The CTS response to the schedule allocation frame 702 (e.g., and other responses to sharing AP's transmissions) helps provide protection from hidden STAs of the sharing AP. For example, CTS frame 710 provides protection from (e.g., sets the NAV for) STA(s) around AP2 that are hidden to AP1, and CTS 802 provides protection from (e.g., sets the NAV for) STA(s) around AP3 that are hidden to AP1. Thus, in effect, CTS frame 710 and CTS 802 extend the NAV protection for the communication by AP1.

The frame 706 (e.g., MU-RTS TXS' frame) and the CTS frame 712 (e.g., CTS2self) response to frame 706 sets the NAV for the duration 822 of the shared TXOP. As shown, during duration 822 (e.g., while the TXOP is shared with AP2), intra-BSS NAV may be set for AP1's BSS and AP2's BSS and basic-NAV may be set for other BSSs (e.g., BSS of AP3). The intra-BSS NAV may be set for BSS of AP1 due to the TA field of frame 706 being set to the identifier of AP1 and intra-BSS NAV may be set for the BSS of AP2 due to the RA field of the frame 706 being set to the identifier of AP2. The CTS frame 712 also sets the intra-BSS NAV for AP2's BSS. It is possible that the duration 822 of the shared TXOP is longer than the amount of time the shared AP (e.g., AP2) needs to serve its STA(s). The shared AP's CF-END frame transmission (e.g., the transmission of frame 716) truncates the shared TXOP and returns it back to the sharing AP (e.g., AP2). In response to the frame 716, the NAV resets for each AP or STA that receives the frame 716 while the STAs of AP1 continue to have intra-BSS NAV. That is, in response to the transmission of frame 716, the intra-BSS NAV for AP2's STA(s) may be reset and the basic NAV may be reset for STA(s) of other BSSs that received the CTS frame 712. AP1's STA(s) may not reset their intra-BSS NAV since the TA of frame 716 is set to the identifier of AP2 (e.g., the RA field of frame 716 is set to BC) and the STA(s) of AP1 still consider the intra-BSS NAV set by frame 706 as valid.

Once the TXOP is returned to the owner AP (AP1), the owner AP can once again serve in-BSS STAs. As described, the intra-BSS NAV may be still set for AP1's BSS and the AP1's transmissions to AP1's STA(s) may set basic NAV for other BSSs (e.g., BSS of AP2 and BSS of AP3), during duration 896. For instance, the owner AP may perform the frame exchange 808 after the TXOP is returned to AP1.

Alternatively, owner AP may share the TXOP with another AP (e.g., AP3). For instance, the owner AP may reset, via transmission of a frame 804 (e.g., a CF-END frame), the intra-BSS NAV for AP1's STA(s) and basic-NAV for STA(s) that only received frame 706. The owner AP may transmit a TXOP allocation frame 806 with an RA field set to the identifier of AP3. In some aspects, in response to receiving frame 806, AP2 may transmit a frame 892 (e.g., a CTS frame) with an RA field set to an identifier of AP3, causing a basic-NAV to be set by STA(s) belonging to the BSS of AP2 that may be hidden from AP1 and AP3. AP1 may then transmit the TXOP allocation frame 806 (e.g., an MU-RTS TXS') with an RA field set to an identifier AP3 to share the TXOP with AP3. In response to receiving frame 806, AP3 may send a CTS frame 810 (e.g., a CTS2self with an RA field set to the identifier of AP3), after which the frame exchange 812 may occur between AP3 and associated STA(s). The frame 806 (and the CTS frame 810) may set (e.g., during duration 898) the intra-BSS NAV for the BSS of AP1 and the BSS of AP3 and the basic NAV for other BSSs (e.g., BSS of AP2).

Certain aspects of the present disclosure have provided a C-TDMA frame exchange sequence, including a scheduling frame for upfront identification of shared AP(s). Certain aspects reuse an MU-RTS (TXS) frame for initial schedule announcement and for sharing the TXOP. A CF-end frame may be used to return the shared TXOP to the TXOP owner, in some aspects. Certain aspects also provide a NAV protection mechanism that correctly sets the inter-BSS or basic-NAV at various instances in the sequence for STAs belonging to different BSSs. The TXOP sharing scheme described herein may be applied for legacy as well as UHR STAs, and enables HE/EHT STAs from participating during the shared TXOP.

Example Operations for TXOP Sharing

FIG. 9 shows a flowchart illustrating a process 900 performable at an apparatus, according to some aspects of the present disclosure. The operations of the process 900 may be implemented by the apparatus or its components as described herein. For example, the process 900 may be performed by a wireless communication device, such as a wireless communication device 1100 described with reference to FIG. 11. In some examples, the process 900 may be performed by the apparatus, such as one of the wireless APs 102 described with reference to FIG. 1. The operations of the process 900 and subject matter of the present disclosure may be applicable for different systems.

At 905, the process 900 includes the apparatus outputting, for transmission to a first wireless node, a first frame indicating one or more candidate nodes with which a transmission opportunity (TXOP) may be shared, the one or more candidate nodes including the first wireless node.

At 910, the apparatus performs a frame exchange with one or more second wireless nodes that shares a first basic service set (BSS) with the apparatus.

At 915, the apparatus outputs, for transmission to the first wireless node, a second frame indicating a portion of the TXOP to be shared with the first wireless node, the second frame being outputted for transmission after the frame exchange.

At 920, the apparatus obtains, from the first wireless node, a third frame indicating that the TXOP is being returned back to the apparatus.

In some aspects, the first frame is configured to indicate each of the one or more candidate nodes based on one or more identifiers. The one or more identifiers may be based on at least one of a basic service set (BSS) color of each of the one or more candidate nodes, a portion of a basic service set identifier (BSSID) of each of the one or more candidate nodes, an identifier assigned by the apparatus to each of the one or more candidate nodes, or an identifier assigned by an entity that manages the apparatus and the one or more candidate nodes.

In some aspects, the first frame indicates a length of the TXOP. In some aspects, the second frame indicates a duration of the portion of TXOP being shared with the first wireless node.

In some aspects, the apparatus obtains a buffer status associated with the first wireless node and generates the second frame based on the buffer status. The buffer status may be a per-traffic flow buffer status, a per-traffic type buffer status, a per-traffic priority buffer status, a per-client buffer status, or a total buffer status. The buffer status may be output for transmission as part of a beacon frame. In some cases, the apparatus outputs, for transmission to the first wireless node, a polling message, wherein the buffer status is obtained after outputting the polling message.

In some aspects, the first frame is configured to at least one of: cause an intra-BSS network allocation vector (NAV) to be set for the one or more second wireless nodes belonging to the first BSS, or cause a basic-NAV to be set for one or more third wireless nodes belonging to at least one second BSS different than the first BSS. In some aspects, the second frame is configured to at least one of: cause a first intra-BSS NAV to be set for the one or more second wireless nodes belonging to the first BSS; cause a second intra-BSS NAV to be set for one or more third wireless nodes belonging to a second BSS associated with the first wireless node; or cause a basic-NAV to be set for one or more fourth wireless nodes belonging to at least one third BSS different than the first BSS and also different than the second BSS. The third frame may be configured to reset the second intra-BSS NAV. The apparatus may output, for transmission, a fourth frame to reset the first intra-BSS NAV, and output, for transmission, a fifth frame indicating that another portion of the TXOP to be shared with a third wireless node, the fifth frame being outputted for transmission after the fourth frame is outputted for transmission.

In some aspects, the first frame or the second frame indicates at least one of a category of communication, a traffic priority, or a traffic type for which the portion of the TXOP is to be used. The first frame or the second frame may indicate one or more third wireless nodes with which the first wireless node is to communicate with using the portion of the TXOP being shared.

In some aspects, the first frame includes a transmit address (TA) field set to an identifier of the apparatus. The second frame may include a TA field set to an identifier of the apparatus, and an RA field set to an identifier of the first wireless node. In some aspects, the third frame may include a TA field set to an identifier of the first wireless node.

Figure 11:
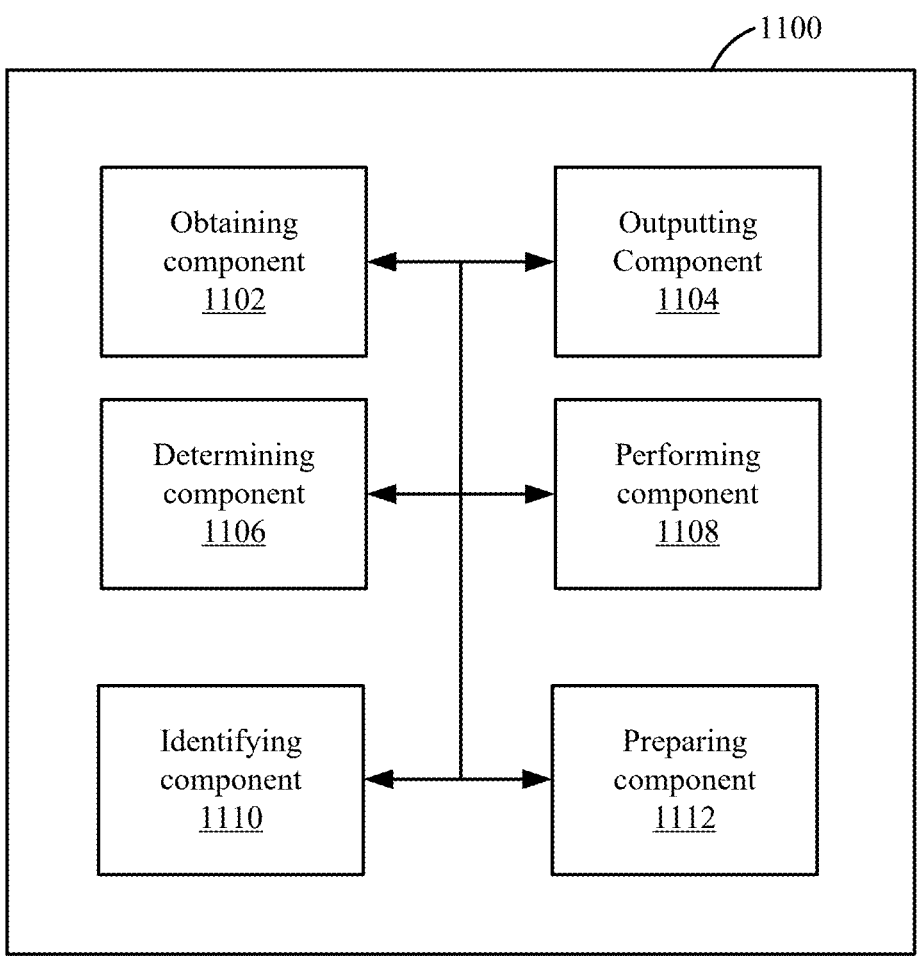
FIG. 11 shows a block diagram of an example wireless communication device.

In one aspect, process 900, or any aspect related to it, may be performed by an apparatus, such as wireless communication device 1100 of FIG. 11, which includes various components operable, configured, or adapted to perform the process 900. Communications device 1100 is described below in further detail. Note that FIG. 9 is just one example of a method, and other methods including fewer, additional, or alternative steps are possible consistent with this disclosure.

FIG. 10 shows a flowchart illustrating a process 1000 performable at an apparatus, according to some aspects of the present disclosure. The operations of the process 1000 may be implemented by the apparatus or its components as described herein. For example, the process 1000 may be performed by a wireless communication device, such as a wireless communication device 1100 described with reference to FIG. 11. In some examples, the process 1000 may be performed by the apparatus, such as one of the wireless APs 102 described with reference to FIG. 1. The operations of the process 1000 and subject matter of the present disclosure may be applicable for different systems.

At 1005, the process 1000 includes the apparatus obtaining, from a first wireless node, a first frame indicating at least one of the apparatus or one or more candidate nodes with which a transmission opportunity (TXOP) may be shared.

At 1010, the apparatus prepares for a frame exchange with one or more second wireless nodes that shares a first basic service set (BSS) with the apparatus in response to obtaining the first frame.

At 1015, the apparatus obtains, from the first wireless node, a second frame indicating that a portion of the TXOP is to be shared with the apparatus.

At 1020, the apparatus performs the frame exchange with the one or more second wireless nodes after obtaining of the second frame.

At 1025, the apparatus outputs, for transmission to the first wireless node, a third frame indicating that the TXOP is being returned back to the first wireless node.

In some aspects, the first frame is configured to indicate each of the one or more candidate nodes based on one or more identifiers. The one or more identifiers may be based on at least one of a basic service set (BSS) color of each of the one or more candidate nodes, a portion of a basic service set identifier (BSSID) of each of the one or more candidate nodes, an identifier assigned by the apparatus to each of the one or more candidate nodes, or an identifier assigned by an entity that manages the apparatus and the one or more candidate nodes.

In some aspects, the first frame indicates a length of the TXOP, and wherein preparing for the frame exchange is based on the length of the TXOP. In some aspects, the second frame indicates a duration of the portion of TXOP being shared with the first wireless node, and wherein a duration of the frame exchange is less than or equal to the duration of the portion of the TXOP.

In some aspects, the apparatus outputs, for transmission, a buffer status associated with the apparatus. The buffer status may include a per-flow buffer status, a per-traffic type buffer status, a per-traffic priority buffer status, a per-client buffer status, or a total buffer status. In some aspects, the apparatus obtains, from the first wireless node, a polling message, wherein the buffer status is outputted for transmission after obtaining the polling message.

In some aspects, the first frame is configured to at least one of cause an intra-BSS network allocation vector (NAV) to be set for one or more third wireless nodes belonging to a second BSS associated with the first wireless node, or cause a basic-NAV to be set for one or more fourth wireless nodes belonging to at least one third BSS different than the second BSS.

In some aspects, the second frame is configured to at least one of cause a first intra-BSS NAV to be set for the one or more second wireless nodes belonging to the first BSS, cause a second intra-BSS NAV to be set for one or more third wireless nodes belonging to a second BSS associated with the first wireless node, or cause a basic-NAV to be set for one or more fourth wireless nodes belonging to at least one third BSS different than the first BSS and also different than the second BSS. The third frame may be configured to reset the second intra-BSS NAV.

In some aspects, the first frame or the second frame indicates at least one of a category of communication, a traffic priority, or a traffic type for which the portion of the TXOP is to be used, wherein the frame exchange is in accordance with the category of communication. In some aspects, the first frame or the second frame indicates at least one of the one or more second wireless nodes with which the first wireless node is to communicate with using the portion of the TXOP being shared.

In some aspects, the first frame includes a transmit address (TA) field set to an identifier of the apparatus. The second frame may include a TA field set to an identifier of the first wireless node, and an RA field set to an identifier of the apparatus. The third frame may include a TA field set to an identifier of the first wireless node.

In some aspects, the apparatus outputs, for transmission, a fourth frame in response to obtaining the first frame, the fourth frame being configured to cause an intra-BSS NAV to be set for one or more third wireless nodes belonging to a second BSS associated with the first wireless node. In some aspects, the apparatus outputs, for transmission, a fourth frame in response to obtaining the second frame, the fourth frame being configured to cause an intra-BSS NAV to be set for the one or more second wireless nodes belonging to the first BSS associated with the first wireless node. In some cases, the apparatus outputs, for transmission, a fourth frame in response to obtaining the second frame, wherein the fourth frame includes an RA field set to an identifier of the first wireless node.

In some aspects, the apparatus obtains a fourth frame indicating that a portion of the TXOP is being shared with a third wireless node, and outputs, for transmission, a fifth frame configured to cause a basic-NAV to be set for the one or more second wireless nodes sharing the first BSS with the first wireless node in response to obtaining the fourth frame.

In some aspects, the apparatus identifies the second frame as sharing the portion of the TXOP based on at least one of a type of the second frame, a TA field of the second frame being set to an identifier of the first wireless node, or a RA field of the second frame being set to an identifier of the apparatus or one of the one or more candidate nodes.

FIG. 11 shows a block diagram of a wireless communication device 1100 (such as an AP or non-AP STA), according to some aspects of the present disclosure. In one example, the wireless communication device 1100 is configured or operable to perform one or more methods described herein. In various examples, the wireless communication device 1100 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1100 can be a device for use in an AP, such as AP 102 described with reference to FIG. 1. In some other examples, the wireless communication device 1100 can be an AP that includes a chip, SoC, chipset, package or device as well as multiple antennas. The wireless communication device 1100 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1100 also includes or can be coupled with an application processor which may be further coupled with another memory. In some examples, the wireless communication device 1100 further includes at least one external network interface that enables communication with a core network or backhaul network to gain access to external networks including the Internet.

The wireless communication device 1100 includes obtaining component 1102, outputting component 1104, generating component 1106, and performing component 1108.

Portions of one or more of the components 1102, 1104, 1106, 1108, 1110, 1112 may be implemented at least in part in hardware or firmware. For example, the obtaining component 1102 and the outputting component 1104 may be implemented at least in part by a modem. In some examples, at least some of the components 1102, 1104, 1106, 1108, 1110, 1112 are implemented at least in part by at least one processor and as software stored in a memory. For example, portions of one or more of the components 1102, 1104, 1106, 1108, 1110, 1112 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the wireless communication device 1100). For example, a processing system of the wireless communication device 1100 may refer to a system including the various other components or subcomponents of the wireless communication device 1100, such as the processor, or a transceiver, or a communications manager, or other components or combinations of components of the wireless communication device 1100. The processing system of the wireless communication device 1100 may interface with other components of the wireless communication device 1100, and may process information received from other components (such as inputs or signals) or output information to other components. For example, a chip or modem of the wireless communication device 1100 may include a processing system, a first interface to output information and a second interface to obtain information. In some implementations, the first interface may refer to an interface between the processing system of the chip or modem and a transmitter, such that the wireless communication device 1100 may transmit information output from the chip or modem. In some implementations, the second interface may refer to an interface between the processing system of the chip or modem and a receiver, such that the wireless communication device 1100 may obtain information or signal inputs, and the information may be passed to the processing system. A person having ordinary skill in the art will readily recognize that the first interface also may obtain information or signal inputs, and the second interface also may output information or signal outputs.

Various components of the wireless communication device 1100 may provide means for performing the process 900 described with reference to FIG. 9, the process 1000 described with reference to FIG. 10, or any aspect related to them. Means for receiving or obtaining may include transceivers and/or antenna(s) of the AP 102 described with reference to FIG. 1 and/or the obtaining component 1102 of the wireless communication device 1100. Means for transmitting, sending or outputting for transmission may include transceivers and/or antenna(s) of the AP 102 described with reference to FIG. 1 and/or the outputting component 1104 of the wireless communication device 1100.

Means for generating may include one or more processors (such as a receive processor, a controller, and/or a transmit processor) of the AP 102 described with reference to FIG. 1 and/or the generating component 1106 of the wireless communication device 1100. Means for performing may include one or more processors (such as a receive processor, a controller, and/or a transmit processor) of the AP 102 described with reference to FIG. 1 and/or the performing component 1108 of the wireless communication device 1100. Means for identifying may include one or more processors (such as a receive processor, a controller, and/or a transmit processor) of the AP 102 described with reference to FIG. 1 and/or the identifying component 1110 of the wireless communication device 1100. Means for preparing may include one or more processors (such as a receive processor, a controller, and/or a transmit processor) of the AP 102 described with reference to FIG. 1 and/or the preparing component 1112 of the wireless communication device 1100.

In some cases, rather than actually transmitting, for example, signals and/or data, the wireless communication device 1100 may have an interface to output signals and/or data for transmission (means for outputting). For example, a processor may output signals and/or data, via a bus interface, to a radio frequency (RF) front end of the wireless communication device 1100 for transmission. In various aspects, the RF front end may include various components, including transmit and receive processors, transmit and receive MIMO processors, modulators, demodulators, and the like.

In some cases, rather than actually receiving signals and/or data, the wireless communication device 1100 may have an interface to obtain the signals and/or data received from another device (means for obtaining). For example, a processor may obtain (or receive) the signals and/or data, via a bus interface, from an RF front end of the wireless communication device 1100 for reception. In various aspects, the RF front end may include various components, including transmit and receive processors, transmit and receive MIMO processors, modulators, demodulators, and the like.

Example Aspects

Implementation examples are described in the following numbered clauses:

Aspect 1: A method for wireless communications by an a first wireless node, comprising: outputting, for transmission to a second wireless node, a first frame indicating one or more candidate nodes with which a transmission opportunity (TXOP) may be shared, the one or more candidate nodes including the second wireless node; performing a frame exchange with one or more third wireless nodes that shares a first basic service set (BSS) with the first wireless node; outputting, for transmission to the second wireless node, a second frame indicating a portion of the TXOP to be shared with the second wireless node, the second frame being outputted for transmission after the frame exchange; and obtaining, from the second wireless node, a third frame indicating that the TXOP is being returned back to the first wireless node.

Aspect 2: The method of Aspect 1, wherein the first frame indicates each of the one or more candidate nodes based on one or more identifiers.

Aspect 3: The method of Aspect 2, wherein the one or more identifiers are based on at least one of a basic service set (BSS) color of each of the one or more candidate nodes, a portion of a basic service set identifier (BSSID) of each of the one or more candidate nodes, an identifier assigned by the first wireless node to each of the one or more candidate nodes, or an identifier assigned by an entity that manages the first wireless node and the one or more candidate nodes.

Aspect 4: The method according to any of Aspects 1-3, wherein the first frame indicates a length of the TXOP.

Aspect 5: The method according to any of Aspects 1-4, wherein the second frame indicates a duration of the portion of TXOP being shared with the second wireless node.

Aspect 6: The method according to any of Aspects 1-5, further comprising obtaining a buffer status associated with the second wireless node; and generate the second frame based on the buffer status.

Aspect 7: The method of Aspect 6, wherein the buffer status comprises a per-traffic flow buffer status, a per-traffic type buffer status, a per-traffic priority buffer status, a per-client buffer status, or a total buffer status.

Aspect 8: The method of Aspect 6 or 7, wherein the buffer status is output for transmission as part of a beacon frame.

Aspect 9: The method according to any of Aspects 6-8, further comprising outputting, for transmission to the second wireless node, a polling message, wherein the buffer status is obtained after outputting the polling message.

Aspect 10: The method according to any of Aspects 1-9, wherein the first frame is configured to at least one of: cause an intra-BSS network allocation vector (NAV) to be set for the one or more third wireless nodes belonging to the first BSS; or cause a basic-NAV to be set for one or more fourth wireless nodes belonging to at least one second BSS different than the first BSS.

Aspect 11: The method according to any of Aspects 1-10, wherein the second frame is configured to at least one of: cause a first intra-BSS NAV to be set for the one or more third wireless nodes belonging to the first BSS; cause a second intra-BSS NAV to be set for one or more fourth wireless nodes belonging to a second BSS associated with the second wireless node; or cause a basic-NAV to be set for one or more fifth wireless nodes belonging to at least one third BSS different than the first BSS and also different than the second BSS.

Aspect 12: The method of Aspect 11, wherein the third frame is configured to reset the second intra-BSS NAV.

Aspect 13: The method of Aspect 11 or 12, further comprising outputting, for transmission, a fourth frame to reset the first intra-BSS NAV; and outputting, for transmission, a fifth frame indicating that another portion of the TXOP to be shared with a fourth wireless node, the fifth frame being outputted for transmission after the fourth frame is outputted for transmission.

Aspect 14: The method according to any of Aspects 1-13, wherein the first frame or the second frame indicates at least one of a category of communication, a traffic priority, or a traffic type for which the portion of the TXOP is to be used.

Aspect 15: The method according to any of Aspects 1-14, wherein the first frame or the second frame indicates one or more fourth wireless nodes with which the second wireless node is to communicate with using the portion of the TXOP being shared.

Aspect 16: The method according to any of Aspects 1-15, wherein the first frame includes a transmit address (TA) field set to an identifier of the first wireless node.

Aspect 17: The method according to any of Aspects 1-16, wherein the second frame includes a TA field set to an identifier of the first wireless node, and an RA field set to an identifier of the second wireless node.

Aspect 18: The method according to any of Aspects 1-17, wherein the third frame comprises a TA field set to an identifier of the second wireless node.

Aspect 19: The method according to any of Aspects 1-19, further comprising obtaining information indicating a processing delay associated with the first wireless node, wherein a time at which the TXOP is shared with the second wireless node is based on a processing delay.

Aspect 20: The method according to any of Aspects 1-18, wherein the first wireless node comprises at least one transceiver configured to transmit the first frame, and wherein the first wireless node is configured as an access point.

Aspect 21: A method for wireless communications by a first wireless node, comprising: obtaining, from a second wireless node, a first frame indicating at least one of the first wireless node or one or more candidate nodes with which a transmission opportunity (TXOP) may be shared; preparing for a frame exchange with one or more third wireless nodes that shares a first basic service set (BSS) with the first wireless node in response to obtaining the first frame; obtaining, from the second wireless node, a second frame indicating that a portion of the TXOP is to be shared with the first wireless node; performing the frame exchange with the one or more third wireless nodes after obtaining of the second frame; and outputting, for transmission to the second wireless node, a third frame indicating that the TXOP is being returned back to the second wireless node.

Aspect 22: The method of Aspect 21, wherein the first frame is configured to indicate each of the one or more candidate nodes based on one or more identifiers.

Aspect 23: The method of Aspect 22, wherein the one or more identifiers are based on at least one of a basic service set (BSS) color of each of the one or more candidate nodes, a portion of a basic service set identifier (BSSID) of each of the one or more candidate nodes, an identifier assigned by the first wireless node to each of the one or more candidate nodes, or an identifier assigned by an entity that manages the first wireless node and the one or more candidate nodes.

Aspect 24: The method according to any of Aspects 21-23, wherein the first frame indicates a length of the TXOP, and wherein preparing for the frame exchange is based on the length of the TXOP.

Aspect 25: The method according to any of Aspects 21-24, wherein the second frame indicates a duration of the portion of TXOP being shared with the second wireless node, and wherein a duration of the frame exchange is less than or equal to the duration of the portion of the TXOP.

Aspect 26: The method according to any of Aspects 21-25, further comprising outputting, for transmission, a buffer status associated with the first wireless node.

Aspect 27: The method of Aspect 26, wherein the buffer status comprises a per-flow buffer status, a per-traffic type buffer status, a per-traffic priority buffer status, a per-client buffer status, or a total buffer status.

Aspect 28: The method of Aspect 26 or 27, further comprising obtaining, from the second wireless node, a polling message, wherein the buffer status is outputted for transmission after obtaining the polling message.

Aspect 29: The method according to any of Aspects 21-28, wherein the first frame is configured to at least one of: cause an intra-BSS network allocation vector (NAV) to be set for one or more fourth wireless nodes belonging to a second BSS associated with the second wireless node; or cause a basic-NAV to be set for one or more fourth wireless nodes belonging to at least one third BSS different than the second BSS.

Aspect 30: The method according to any of Aspects 21-29, wherein the second frame is configured to at least one of: cause a first intra-BSS NAV to be set for the one or more third wireless nodes belonging to the first BSS; cause a second intra-BSS NAV to be set for one or more fourth wireless nodes belonging to a second BSS associated with the second wireless node; or cause a basic-NAV to be set for one or more fifth wireless nodes belonging to at least one third BSS different than the first BSS and also different than the second BSS.

Aspect 31: The method of Aspect 30, wherein the third frame is configured to reset the second intra-BSS NAV.

Aspect 32: The method according to any of Aspects 21-31, wherein the first frame or the second frame indicates at least one of a category of communication, a traffic priority, or a traffic type for which the portion of the TXOP is to be used, wherein the frame exchange is in accordance with the category of communication.

Aspect 33: The method according to any of Aspects 21-32, wherein the first frame or the second frame indicates at least one of the one or more third wireless nodes with which the second wireless node is to communicate with using the portion of the TXOP being shared.

Aspect 34: The method according to any of Aspects 21-33, wherein the first frame includes a transmit address (TA) field set to an identifier of the first wireless node.

Aspect 35: The method according to any of Aspects 21-34, wherein the second frame includes a TA field set to an identifier of the second wireless node, and an RA field set to an identifier of the first wireless node.

Aspect 36: The method according to any of Aspects 21-35, wherein the third frame comprises a TA field set to an identifier of the second wireless node.

Aspect 37: The method according to any of Aspects 21-36, further comprising outputting, for transmission, a fourth frame in response to obtaining the first frame, the fourth frame being configured to cause an intra-BSS NAV to be set for one or more fourth wireless nodes belonging to a second BSS associated with the second wireless node.

Aspect 38: The method according to any of Aspects 21-37, further comprising outputting, for transmission, a fourth frame in response to obtaining the second frame, the fourth frame being configured to cause an intra-BSS NAV to be set for the one or more third wireless nodes belonging to the first BSS associated with the second wireless node.

Aspect 39: The method according to any of Aspects 21-38, further comprising outputting, for transmission, a fourth frame in response to obtaining the second frame, wherein the fourth frame includes an RA field set to an identifier of the second wireless node.

Aspect 40: The method according to any of Aspects 21-39, further comprising obtaining a fourth frame indicating that a portion of the TXOP is being shared with a fourth wireless node; and output, for transmission, a fifth frame configured to cause a basic-NAV to be set for the one or more third wireless nodes sharing the first BSS with the second wireless node in response to obtaining the fourth frame.

Aspect 41: The method according to any of Aspects 21-40, wherein the first wireless node comprises at least one transceiver configured to receive the first frame, and wherein the first wireless node is configured as an access point.

Aspect 42: The method according to any of Aspects 21-40, further comprising identifying the second frame as sharing the portion of the TXOP based on at least one of a type of the second frame, a TA field of the second frame being set to an identifier of the second wireless node, or a RA field of the second frame being set to an identifier of the first wireless node or one of the one or more candidate nodes.

Aspect 43: The method according to any of Aspects 21-40, further comprising outputting, for transmission, information indicating a processing delay associated with the first wireless node.

Aspect 44: The method according to Aspect 43, wherein the information is outputted for transmission as part of a broadcast frame, as part of a beacon frame, as part of a broadcast probe response frame, or during negotiations between the first wireless node and the second wireless node for coordination.

Aspect 45: An apparatus, comprising: a memory comprising executable instructions; and at least one processor configured to execute the executable instructions and cause the apparatus to perform a method in accordance with any one of Aspects 1-44.

Aspect 46: An apparatus, comprising means for performing a method in accordance with any one of Aspects 1-44.

Aspect 47: A non-transitory computer-readable medium comprising executable instructions that, when executed by at least one processor of an apparatus, cause the apparatus to perform a method in accordance with any one of Aspects 1-44.

A computer program product embodied on a computer-readable storage medium comprising code for performing a method in accordance with any one of Aspects 1-44.

An access point comprising: at least one transceiver, a memory comprising executable instructions; and at least one processor configured to execute the executable instructions and cause the access point to perform a method in accordance with any one of Aspects 1-20, wherein the at least one transceiver is configured to transmit the first frame.

An access point comprising: at least one transceiver, a memory comprising executable instructions; and at least one processor configured to execute the executable instructions and cause the access point to perform a method in accordance with any one of Aspects 21-43, wherein the at least one transceiver is configured to receive the first frame.

ADDITIONAL CONSIDERATIONS

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The invention claimed is:

1. A wireless node, comprising:
at least one transceiver;
at least one processor; and
one or more memories comprising instructions executable by the at least one processor to cause the wireless node to:
transmit, to a first wireless node via the at least one transceiver, a first frame indicating one or more candidate nodes with which a transmission opportunity (TXOP) may be shared, the one or more candidate nodes including the first wireless node;
perform a frame exchange with one or more second wireless nodes that shares a first basic service set (BSS) with the wireless node;
transmit, to the first wireless node via the at least one transceiver, a second frame indicating a portion of the TXOP to be shared with the first wireless node, the second frame being transmitted after the frame exchange; and
receive, from the first wireless node via the at least one transceiver, a third frame indicating that the TXOP is being returned back to the wireless node.

2. The wireless node of claim 1, wherein the first frame is configured to indicate each of the one or more candidate nodes based on one or more identifiers.

3. The wireless node of claim 1, wherein the first frame indicates a length of the TXOP.

4. The wireless node of claim 1, wherein the second frame indicates a duration of the portion of TXOP being shared with the first wireless node.

5. The wireless node of claim 1, wherein the at least one processor is further configured to cause the wireless node to:
receive, via the at least one transceiver, a buffer status associated with the first wireless node; and
generate the second frame based on the buffer status.

6. The wireless node of claim 1, wherein the first frame is configured to at least one of:
cause an intra-BSS network allocation vector (NAV) to be set for the one or more second wireless nodes belonging to the first BSS; or
cause a basic-NAV to be set for one or more third wireless nodes belonging to at least one second BSS different than the first BSS.

7. The wireless node of claim 1, wherein the second frame is configured to at least one of:
cause a first intra-BSS NAV to be set for the one or more second wireless nodes belonging to the first BSS;
cause a second intra-BSS NAV to be set for one or more third wireless nodes belonging to a second BSS associated with the first wireless node; or cause a basic-NAV to be set for one or more fourth wireless nodes belonging to at least one third BSS different than the first BSS and also different than the second BSS.

8. The wireless node of claim 7, wherein the third frame is configured to reset the second intra-BSS NAV.

9. The wireless node of claim 7, wherein the at least one processor is further configured to cause the wireless node to:

transmit, via the at least one transceiver, a fourth frame to reset the first intra-BSS NAV; and transmit, via the least one transceiver, a fifth frame indicating that another portion of the TXOP to be shared with a third wireless node, the fifth frame being transmitted after the fourth frame was transmitted.

10. The wireless node of claim 1, wherein the first frame or the second frame indicates at least one of a category of communication, a traffic priority, or a traffic type for which the portion of the TXOP is to be used.

11. The wireless node of claim 1, wherein the first frame or the second frame indicates one or more third wireless nodes with which the first wireless node is to communicate with using the portion of the TXOP being shared.

12. The wireless node of claim 1, wherein the second frame includes a TA field set to an identifier of the wireless node, and an RA field set to an identifier of the first wireless node.

13. The wireless node of claim 1, wherein the third frame comprises a TA field set to an identifier of the first wireless node.

14. A wireless node, comprising:

at least one transceiver;

at least one processor; and one or more memories comprising instructions executable by the at least one processor to cause the wireless node to:

receive, from a first wireless node via the at least one transceiver, a first frame indicating at least one of the wireless node or one or more candidate nodes with which a transmission opportunity (TXOP) may be shared;

prepare for a frame exchange with one or more second wireless nodes that shares a first basic service set (BSS) with the wireless node in response to receiving the first frame;

receive, from the first wireless node via the at least one transceiver, a second frame indicating that a portion of the TXOP is to be shared with the wireless node;

perform the frame exchange with the one or more second wireless nodes after receiving the second frame; and transmit, to the first wireless node via the at least one transceiver, a third frame indicating that the TXOP is being returned back to the first wireless node.

15. The wireless node of claim 14, wherein the first frame is configured to indicate each of the one or more candidate nodes based on one or more identifiers.

16. The wireless node of claim 14, wherein the first frame indicates a length of the TXOP, and wherein preparing for the frame exchange is based on the length of the TXOP.

17. The wireless node of claim 14, wherein the second frame indicates a duration of the portion of TXOP being shared with the first wireless node, and wherein a duration of the frame exchange is less than or equal to the duration of the portion of the TXOP.

18. The wireless node of claim 14, wherein the at least one processor is further configured to cause the wireless node to transmit, via the at least one transceiver, a buffer status associated with the wireless node.

19. The wireless node of claim 14, wherein the first frame is configured to at least one of:

cause an intra-BSS network allocation vector (NAV) to be set for one or more third wireless nodes belonging to a second BSS associated with the first wireless node; or cause a basic-NAV to be set for one or more fourth wireless nodes belonging to at least one third BSS different than the second BSS.

20. The wireless node of claim 14, wherein the second frame is configured to at least one of:

cause a first intra-BSS NAV to be set for the one or more second wireless nodes belonging to the first BSS;

cause a second intra-BSS NAV to be set for one or more third wireless nodes belonging to a second BSS associated with the first wireless node; or cause a basic-NAV to be set for one or more fourth wireless nodes belonging to at least one third BSS different than the first BSS and also different than the second BSS.

21. The wireless node of claim 20, wherein the third frame is configured to reset the second intra-BSS NAV.

22. The wireless node of claim 14, wherein the first frame or the second frame indicates at least one of a category of communication, a traffic priority, or a traffic type for which the portion of the TXOP is to be used, wherein the frame exchange is in accordance with the category of communication.

23. The wireless node of claim 14, wherein the first frame or the second frame indicates at least one of the one or more second wireless nodes with which the first wireless node is to communicate with using the portion of the TXOP being shared.

24. The wireless node of claim 14, wherein the at least one processor is further configured to cause the wireless node to transmit, via the at least one transceiver, a fourth frame in response to receiving the first frame, the fourth frame being configured to cause an intra-BSS NAV to be set for one or more third wireless nodes belonging to a second BSS associated with the first wireless node.

25. The wireless node of claim 14, wherein the at least one processor is further configured to cause the wireless node to transmit, via the at least one transceiver, a fourth frame in response to receiving the second frame, the fourth frame being configured to cause an intra-BSS NAV to be set for the one or more second wireless nodes belonging to the first BSS associated with the first wireless node.

26. The wireless node of claim 14, wherein the at least one processor is further configured to cause the wireless node to transmit, via the at least one transceiver, a fourth frame in response to receiving the second frame, wherein the fourth frame includes an RA field set to an identifier of the first wireless node.

27. The wireless node of claim 14, wherein the at least one processor is further configured to cause the wireless node to:

receive, via the at least one transceiver, a fourth frame indicating that a portion of the TXOP is being shared with a third wireless node; and transmit, via the at least one transceiver, a fifth frame configured to cause a basic-NAV to be set for the one or more second wireless nodes sharing the first BSS with the first wireless node in response to receiving the fourth frame.

28. A method for wireless communications by a first wireless node, comprising:

transmitting, to a second wireless node, a first frame indicating one or more candidate nodes with which a transmission opportunity (TXOP) may be shared, the one or more candidate nodes including the second wireless node;

performing a frame exchange with one or more third wireless nodes that shares a first basic service set (BSS) with the first wireless node;

transmitting, to the second wireless node, a second frame indicating a portion of the TXOP to be shared with the second wireless node, the second frame being transmitted after the frame exchange; and receiving, from the second wireless node, a third frame indicating that the TXOP is being returned back to the first wireless node.

* * * * *